United States Patent [19]

Winslow

[11] Patent Number: 5,116,676

[45] Date of Patent: May 26, 1992

[54] REMOVABLE PRESSURE-SENSITIVE ADHESIVE TAPE

[75] Inventor: Louis E. Winslow, St. Paul, Minn.

[73] Assignee: Minnesota Mining and Manufacturing Company, St. Paul, Minn.

[21] Appl. No.: 702,446

[22] Filed: May 16, 1991

Related U.S. Application Data

[63] Continuation of Ser. No. 414,714, Sep. 29, 1989, abandoned, which is a continuation-in-part of Ser. No. 203,587, May 27, 1988, abandoned, which is a continuation of Ser. No. 111,214, Oct. 22, 1987, abandoned, which is a continuation-in-part of Ser. No. 36,550, Apr. 15, 1987, abandoned.

[51] Int. Cl.$^5$ .......................... C08K 5/52; C32B 7/12
[52] U.S. Cl. .................................. 428/343; 524/145; 524/710
[58] Field of Search .................. 428/343; 524/145, 710

[56] References Cited

U.S. PATENT DOCUMENTS

| | | | |
|---|---|---|---|
| 3,770,708 | 11/1973 | Knoepfel et al. | 260/80.73 |
| 3,922,464 | 11/1975 | Silver et al. | 428/355 |
| 4,629,663 | 12/1986 | Brown et al. | 428/343 |
| 4,645,711 | 2/1987 | Winslow et al. | 428/355 |

FOREIGN PATENT DOCUMENTS

| | | |
|---|---|---|
| 0002409 | 1/1979 | Japan. |
| 60-67579 | 4/1985 | Japan. |

Primary Examiner—Joseph L. Schofer
Assistant Examiner—Peter D. Mulcahy
Attorney, Agent, or Firm—Gary L. Griswold; Walter N. Kirn; James V. Lilly

[57] ABSTRACT

The novel fast-drying pressure-sensitive adhesives comprises a polymer of a terminally unsaturated vinyl monomer such as isooctyl acrylate and an emulsifier monomer such as sodium styrene sulfonate plus a phosphate emulsifier, especially certain polyoxyethylene phosphates or salts thereof. Pressure-sensitive adhesive tapes comprise a backing and the novel adhesive. The novel tape is particularly useful as an automotive masking tape, because it both aheres strongly and can be cleanly removed from automotive paints after typical baking cycles. As compared to prior tapes the novel tapes have equal or better adhesive performance, i.e., at least 35 N/dm of peel adhesion, with a faster drying adhesive layer. The tapes can, therefore, be produced more economically. Furthermore, the adhesive bubbling problem formerly seen with paper backings is eliminated.

15 Claims, No Drawings

REMOVABLE PRESSURE-SENSITIVE ADHESIVE TAPE

Related Applications

This is a continuation of Ser. No. 07/414,714 filed Sep. 29, 1989, now abandoned, which is a continuation-in-part application of U.S. Ser. No. 203,587 filed May 27, 1988, now abandoned which is a continuation of U.S. Ser. No. 111,214 filed Oct. 22, 1987, now abandoned, which is a continuation-in-part of U.S. Ser. No. 036,550, filed Apr. 15, 1987, now abandoned.

BACKGROUND OF THE INVENTION

1. Field of the Invention

The invention concerns novel fast-drying pressuresensitive adhesives having excellent cohesive strength and improved peel resistance. The invention also concerns pressure-sensitive adhesive tapes which usually are slit to narrow widths and then wound upon themselves for storage and shipment. Such tapes are originally produced in wide widths, and the term "tape" encompasses such wide widths. The invention specifically concerns removable pressure-sensitive adhesive tapes such as masking tapes, weatherstripping tapes, label tapes, and protective plating tapes.

2. Description of the Related Art

As is pointed out in U.S. Pat. No. 4,629,663 (Brown et al.), the manufacture of pressuresensitive adhesive tapes is being shifted from organic solvent systems to aqueous latices in order to reduce air pollution and fire hazard and also to eliminate the rising expense of organic solvents. Surfactants, wetting agents, or emulsifying agents are commonly used to protect the aqueous latex from coagulation. Among patents cited in the Brown patent to illustrate this is U.S. Pat. No. 3,770,708 (Knoepfel et al.) which discloses a pressure-sensitive adhesive tape, the adhesive layer of which is a copolymer of vinyl monomers such as a non-tertiary alkyl acrylate and zwitterionic monomer which in part serves as an emulsifying agent that is bound to the polymer, such an emulsifying agent being called an "emulsifier monomer". All of the Knoepfel working examples also employ conventional emulsifying agents which do not become bound to the polymer and are called "external emulsifiers".

The pressure-sensitive adhesive tape of U.S. Pat. No. 3,922,464 (Silver et al.) is similar to that of the Knoepfel patent except in these respects: (1) it is removable, (2) from 0.2 to 5% by weight of at least one vinyl-unsaturated, homopolymerizable emulsifier monomer is copolymerized with the Knoepfel monomers, and (3) the zwitterionic monomer can be omitted. The Silver adhesives also preferably employ "small amounts of external emulsifier, especially where short chain emulsifier monomers are used. Such emulsifiers, which are commonly employed in the preparation of many copolymer latices, assist in initial suspension of the monomeric reactants and tend to result in a more homogeneous appearing emulsion than when they are omitted. On the other hand, excessive amounts of such external emulsifiers tend to ... make the emulsion more difficult to dry" (col. 8, lines 39–55).

Both the Silver patent and the above-cited Brown patent specifically concern pressure-sensitive adhesive tapes that are removable for uses such as automotive masking which require clean removability after baking, e.g., of automotive paint for one hour at 120° C. The pressure-sensitive adhesive tape of the Brown patent, approximately like that of Silver, is a copolymer of monomers comprising (a) from 95 to 99.8 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and (b) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100, and said adhesive layer preferably contains a small amount of an external emulsifier.

The Brown patent says that its adhesive "differs from that of the Silver patent in that the emulsifier monomer comprises a monovalent salt of a styrene sulfonate. As compared to emulsifier monomers named in the Silver patent, a monovalent salt of styrene sulfonate more reliably produces coagulum-free latices, both the latices and polymers produced therefrom tend to have greater hydrolytic stability, and latices of higher solids can be obtained which are easier to coat" (Col. 3, lines 16–24).

U.S. Pat. No. 4,645,711 (Winslow et al.) concerns what was "believed to be the first nonstaining automotive masking tape that reliably resists typical lifting forces at 150° C. from automotive paint and yet can reliably be stripped off cleanly from automotive paint after one hour at 150° C. ... By 'typical lifting forces' are meant those simulated in the 'Curved Panel Lifting Test at 150°'" (col. 3, lines 3–10) described both in the Winslow patent and hereinbelow. The Winslow tape uses the same copolymer as in the Silver patent but differs "in that its layer of pressure-sensitive adhesive comprises from 5 to 50% by weight of" at least one of four classes of tackifier resins. After noting the Silver patent teaching that small amounts of external emulsifiers assist in initial suspension of the monomeric reactants, the Winslow patent prefers using at least 0.05 weight percent of external emulsifier for the same reason (col. 4, lines 31–42).

The backing of each pressure-sensitive adhesive tape of the working examples of the Brown and the Winslow patents is polyester film. When a paper backing has been substituted for the polyester film and the amount of the emulsifier monomer has been within the preferred range of the Brown patent (0.5 to 2 weight percent), it has been necessary to use very low heat in drying the adhesive coating to avoid bubbling of the adhesive layer. This slows the coating process to the point that it is not commercially feasible to use a paper backing for making the preferred tapes of either the Brown or the Winslow patent. While the adhesive coating could be dried more quickly at reduced amounts of the emulsifier monomer, such reduced amounts would result in undesirably reduced cohesive strengths.

OTHER RELATED ART

Because it concerns removable pressure-sensitive adhesive tape having a chemically similar monomer to the adhesive of the present invention, and it employs emulsifiers which are useful in the present invention, attention is directed to Japanese Patent Application JA60-67579 (Asami et al.) which was laid open Apr. 17, 1985. The pressure-sensitive adhesive tape of the Japanese application employs a polymer having substantially the same vinyl monomer (a) as that of the Brown patent (as outlined above). However, the polymer does not employ the emulsifier monomer (b), or any other "emulsifier monomer". After polymerizing the vinyl monomer (a), there is added a phosphate emulsifier such as a polyoxyethylene phosphate having the formula below wherein $R_1$ indicates an alkyl group, alkenyl group, alkyl phenyl group or phenyl group and $R_2$ indicates hydrogen or an alkyl group, alkenyl group, alkyl phenyl group or phenyl group, each group having more than four carbons, and n and m indicate positive integers.

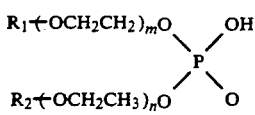

The phosphate emulsifier can also be a salt of the polyoxyethylene phosphate. The Japanese application indicates that in the absence of the phosphate emulsifier, a tape having a layer of the polymer cannot withstand high temperature (120° C. to 160° C.) during bake drying whereas inclusion of the phosphate emulsifier in the adhesive layer enables a tape to be cleanly peeled away after bake drying, presumably after being used to mask a bakable paint. Table 1 of the Japanese application compares three tapes of its invention to three tapes which are identical except for omission of the phosphate emulsifier. Two sets of the tapes were coated from organic solvent, but Example 3 and Comparative Example 3 are of interest, being coated from water. The tape of Comparative Example 3 had reasonably good adhesion (260 g/10 mm), but the adhesion of the tape of Example 3 was so low (90 g/10 mm) that it would not meet any automotive specification of which we are aware.

SUMMARY OF THE INVENTION

The invention provides a novel fast-drying pressure-sensitive adhesive having excellent cohesive strength and improved peel resistance. The invention also provides a removable pressure-sensitive adhesive tape that combines the excellent adhesive performance of preferred tapes of the Silver and Brown patents with a pressure-sensitive adhesive layer that can be dried much faster. Thus, tapes of the invention can be produced more economically. Further, unlike tapes of the prior art, there is no adhesive bubbling problem at commercially useful production rates when using a paper backing.

Removable pressure-sensitive adhesives of the invention comprise a copolymer of monomers comprising
(a) from 95 to 99.9 parts of at least one terminally unsaturated vinyl monomer, 60 to 100 percent of said vinyl monomer being selected from the class of nontertiary alkyl acrylates wherein each alkyl group has at least half of its carbon atoms in a single chain and the average length of the alkyl chain is at least 4 and not more than 12, and
(b) from 0.1 to 5 parts by weight of at least one vinyl-unsaturated homopolymerizable emulsifier monomer which is a surfactant having both a hydrophobic and a hydrophilic moiety, contains at least 5 but not more than 40 carbon atoms, and is water-dispersible,
the total parts of (a) plus (b) being 100.

The adhesive layer of the novel tape differs from that of the Brown patent in that it contains from 0.5 to about 8 parts of polyoxyethylene phosphate and/or salts thereof, such phosphate and its salts being here sometimes called "phosphate emulsifier". Useful phosphate emulsifiers include those of the general formula

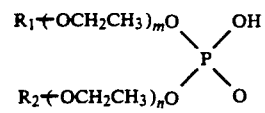

wherein $R_1$ and $R_2$ may be hydrogen, an alkyl group, alkenyl group, phenyl group or an alkyl phenyl group. Preferably emulsifier monomers are selected from at least one of
(i) polyoxyethylene phosphate having the formula

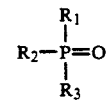

wherein
at least one of $R_1$, $R_2$ and $R_3$ is R—O—(—CH$_2$CH$_2$O)$_n$— —and the others are —OH; R is selected from alkyl, alkenyl, aryl, and alkylaryl; and n is a positive integer; and
(ii) a salt of (i), whereby said adhesive provides at least 87% water loss, and peel adhesion of at least about 35 N/dm.

Preferred salts are sodium, potassium, lithium, and t-amine salts.

The phosphate emulsifier can be added either prior to polymerization or to a latex of a copolymer of the above monomers (a) and (b). Better adhesion can be expected when the phosphate emulsifier has been added to the monomer mixture prior to polymerization. Whether or not the phosphate emulsifier is added prior to polymerization, the adhesive layer of the novel tape preferably includes another external emulsifier such as sodium dodecylbenzene sulfonate.

The preferred amount of phosphate emulsifier depends upon the amount of emulsifier monomer (b) used in making the adhesive copolymer and, to a lesser extent, upon the amount of other external emulsifier. When only 0.1 part of emulsifier monomer (b) is used, the adhesive layer will dry quickly without any phosphate emulsifier, however, it may coagulate because of the low emulsifier monomer level. Higher amounts of emulsifier (b) not only reduce the likelihood of coagulation but also tend to result in better cohesion, especially at paint-baking temperatures. To ensure against coagulation, the amount of emulsifier monomer (b) is preferably at least 0.5 part. At this level of emulsifier monomer (b), about 0.5 part of the phosphate emulsifier should provide quick drying.

As the emulsifier monomer level is increased, the level of the phosphate emulsifier must also be increased to provide the fast drying characteristics. The specific values vary with the type of emulsifier monomer and the type of phosphate monomer used. When amounts of the phosphate emulsifier above 0.5 part are used, greater resistance to lifting forces at elevated temperatures is exhibited by higher values in the "Curved Panel Lifting Test at 150° C. ". Phosphate emulsifier levels above about 2 parts by weight of the phosphate emulsifier typically do not provide further improvement when 0.5 part emulsifier monomer is used, depending on the types. When the amount of emulsifier monomer (b) is about 1 part, faster drying and better resistance to lifting forces may be realized at increased phosphate emulsifier levels, e.g., up to about 6 parts by weight. When the level of phosphate emulsifier has been increased to above 8 parts by weight, there has been a problem with adhesive residue after the "Curved Panel Lifting Test at 150° C."

For reasons taught in the Brown patent, the emulsifier monomer (b) preferably is a monovalent salt of a styrene sulfonate and its amount is from 0.5 to 2.0 parts by weight of (a) plus (b). A preferred salt is sodium styrene sulfonate.

Quick Dry Test (% Water Loss)

A 1-g sample of a latex is poured into a metal cup having a surface area of 13.7 cm$^2$ and immediately covered. After weighing, the cup is uncovered and placed in an air-circulating oven at 200° F. (93.3° C.) for 20 minutes, removed, recovered, and reweighed. A value of at least 87% water loss indicates that the latex is quick drying and should be useful for coating typical paper backings at commercially useful rates.

Before carrying out the following tests, the tape should be held at 22° C. and 50% relative humidity for at least 24 hours and preferably more than 48 hours.

Curved Panel Lifting Test at 150° C.

Used in this test is an aluminum panel having a radius of curvature of 23 cm and a length of 35.5 cm in the curved direction. An automotive paint covers the convex surface of the panel. In order to provide a rigorous test, the paint preferably is one to which masking tapes are difficulty adherent, e.g., an automotive basecoat/-clearcoat (BC/CC) acrylic enamel paint system or the automotive "50J" acrylic enamel paint of Ford Motor Co.

Tapes to be tested have a backing sheet commonly used in masking tapes, namely a creped paper having at basis weight of 30 lbs. per papermaker's ream (about 50 g/m$^2$) and saturated with a polyurethane. A latex of the pressure-sensitive adhesive to be evaluated is knife-coated onto one face of the backing sheet using a 0.1 mm orifice, allowed to dry at room temperature for about 10 minutes, and then dried in an oven for about 5 minutes at 95° C. The resulting tapes are cut to 1×14 inches (2.54×35 cm). A 2×12 inches (5.08×30 cm) strip of nonadhesive masking paper (such as is used for automotive paint aprons) is applied to cover 0.5 inch (1.27 cm) of the adhesive layer except for one inch (2.5 cm) at each end of the tape. This assembly is hand applied to the aluminum panel in its curved direction using the uncovered 0.5 inch (1.27 cm) of the adhesive layer to adhere it to the painted surface.

The assembly-bearing panel is then put into an air-circulating oven at 150° C. for 10 minutes, allowed to cool, and then examined for failure. A rating of "0" means no lifting has occurred. Any lifting at either end of the strip is indicated as the cumulative length of lifting at both ends of the strip. While 0 lifting is most preferable, lifting of up to 0.63 cm is considered acceptable performance; lifting of up to 1.3 cm is considered marginally acceptable.

After cooling to room temperature and examined for lifting, the apron is employed to strip the tape quickly, and the panel is then examined for adhesive residue.

Peel Adhesion Test

A test strip 2.54 cm wide is slit and then adhered to a glass plate mounted on a cart whose speed, when activated, is 2.8 cm/sec. The strip is rolled down with a 2-kg roller. A hook which is attached to a scale by a wire is then attached to the leading edge of the 2.54 cm test strip. The cart is then activated and the test strip is removed at an angle of 180° from the glass plate. The average removal force is noted in N/dm.

The following examples employ the following external emulsifiers:

A = sodium dodecyl benzene sulfonate ("Siponate" DS10, Alcolak, Inc.)

B = sodium alkylaryl polyethoxy sulfonate ("Triton" X-200, Rohm & Haas)

C = monosodium-n-lauryl-$\beta$-iminodipropionic acid ("Deriphat" 160 C, Henkel)

D = potassium alkylaryl polyethoxy phosphate ("Triton" QS-44K, Rohm & Haas)

E = potassium alkylaryl polyethoxy phosphate ("Crafol" AP50, Pulcra S.A.)

F = potassium alkylaryl polyethoxy phosphate ("Servoxyl" VPNZ 10/100, Servo)

G = potassium alkylethoxy phosphate ("Crafol" AP60, Pulcra SA)

H = potassium alkyl phosphate ("Servoxyl" VPTZ, Servo)

I = potassium alkyl polyethoxy phosphate ("EAK" 8190, Rewo Chemical Group)

J = potassium alkyl phosphate, ("Berol" 522, Berol Kemi A.B.)

Of the above external emulsifiers, those that are phosphate emulsifiers are believed to have formulae as follows:

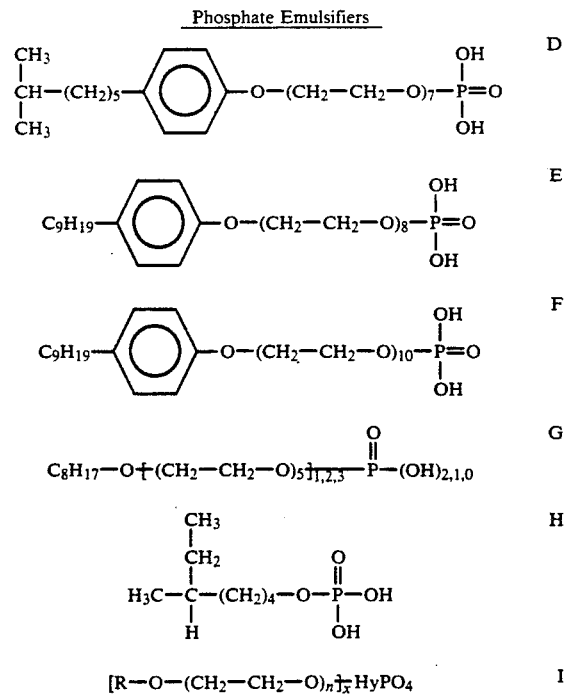

-continued

Phosphate Emulsifiers

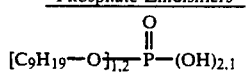

Pressure-Sensitive Adhesive (PSA) Tape 1

To a two-speed Waring blender, the following components were charged (after dissolving the OAA in the IOA):

| Pressure-Sensitive Adhesive (PSA) Tape 1 To a two-speed Waring blender, the following components were charged (after dissolving the OAA in the IOA): | | |
|---|---|---|
| Component | Grams | Monomer Ratio |
| isooctyl acrylate (IOA) | 130.5 | 87 |
| n-octyl acrylamide (OAA) | 18.0 | 12 |
| sodium styrene sulfonate (NaSS) | 1.5 | 1 |
| external Emulsifier A (in a 10% water solution) | 3.0 | |
| sodium bicarbonate (NaHCO3) | 0.75 | |
| deionized water | 182.1 | |

These components were emulsified by running the blender for one minute on slow speed. The emulsion was then poured into a 0.47-liter (16-oz), small-necked amber bottle. To the emulsion in the bottle, 0.15 g potassium persulfate were added, and the bottle was purged for ten minutes with argon. The bottle was then sealed and placed in a "Launderometer" polymerization bath at 50° C. for 16 hours. After this time the bottle was removed, the latex filtered, and saved for evaluation.

A paper-backed pressure-sensitive adhesive tape was made as described in the Curved Panel Lifting Test at 150° C. and was tested on "50J" acrylic enamel paint system and on "BC/CC" basecoat/clearcoat acrylic enamel paint system. Test results are reported in Table I together with results of testing a series of tapes which were prepared in the same way as was PSA Tape 1 except as indicated below.

Again, PSA tapes 1-24 are outside the scope of the invention and are for comparative purposes. As can be seen from the table, PSA tapes within the invention exhibited improved peel resistance. Each of PSA Tapes 1-48 left no residue after the Curved Panel Lifting Test at 150° C. These PSA tapes also exhibited clean removability, and fast drying, evidenced by at least 87% water loss.

TABLE I

| PSA Tape | Monomers | Ratio | External Type | Emulsifier Level(phr) | Peel Adhesion (N/dm) | Quick Dry Test (% Water Loss) | Curved Panel Lifting Test at 150° C. 50 J (cm) | BC/CC (cm) |
|---|---|---|---|---|---|---|---|---|
| *1 | IOA-OAA-NaSS | 87:12:1 | A | 0.2 | 43 | 67.9 | 2.5 | 3.8 |
| *2 | IOA-OAA-NaSS | 87:12:1 | A | 0.4 | 50 | 64.4 | 3.8 | 5.1 |
| *3 | IOA-OAA-NaSS | 87:12:1 | A | 0.6 | 48 | 62.2 | 1.3 | 1.9 |
| *4 | IOA-OAA-NaSS | 87:12:1 | A | 0.8 | 51 | 63.6 | 0.6 | 1.9 |
| *5 | IOA-OAA-NaSS | 87:12:1 | A | 1.0 | 51 | 63.2 | 0.6 | 1.3 |
| *6 | IOA-OAA-NaSS | 87:12:1 | A | 1.2 | 52 | 62.7 | 3.8 | 3.8 |
| *7 | IOA-OAA-NaSS | 87:12:1 | A | 1.4 | 51 | 63.7 | 3.8 | 3.8 |
| *8 | IOA-OAA-NaSS | 87:12:1 | A | 1.6 | 50 | 64.3 | 1.3 | 1.3 |
| *9 | IOA-OAA-NaSS | 87:12:1 | B | 0.2 | 44 | 72.6 | 2.5 | 1.3 |
| *10 | IOA-OAA-NaSS | 87:12:1 | B | 0.4 | 41 | 70.9 | 0.6 | 0.6 |
| *11 | IOA-OAA-NaSS | 87:12:1 | B | 0.6 | 46 | 73.7 | 2.5 | 1.3 |
| *12 | IOA-OAA-NaSS | 87:12:1 | B | 0.8 | 46 | 69.5 | 2.5 | 0.6 |
| *13 | IOA-OAA-NaSS | 87:12:1 | B | 1.0 | 51 | 68.9 | 0 | 0 |
| *14 | IOA-OAA-NaSS | 87:12:1 | B | 1.2 | 49 | 65.8 | 0 | 0.6 |
| *15 | IOA-OAA-NaSS | 87:12:1 | B | 1.4 | 49 | 65.1 | 1.9 | 0.6 |
| *16 | IOA-OAA-NaSS | 87:12:1 | B | 1.6 | 50 | 65.0 | 1.3 | 0.6 |
| *17 | IOA-OAA-NaSS | 87:12:1 | C | 0.2 | 40 | 59.5 | 0.6 | 1.9 |
| *18 | IOA-OAA-NaSS | 87:12:1 | C | 0.4 | 43 | 60.8 | 4.4 | 2.5 |
| *19 | IOA-OAA-NaSS | 87:12:1 | C | 0.6 | 44 | 59.2 | 5.1 | 4.4 |
| *20 | IOA-OAA-NaSS | 87:12:1 | C | 0.8 | 43 | 63.0 | 3.8 | 3.8 |
| *21 | IOA-OAA-NaSS | 87:12:1 | C | 1.0 | 46 | 66.8 | 1.3 | 1.3 |
| *22 | IOA-OAA-NaSS | 87:12:1 | C | 1.2 | 44 | 70.0 | 0.6 | 1.9 |
| *23 | IOA-OAA-NaSS | 87:12:1 | C | 1.4 | 45 | 74.1 | 1.3 | 3.8 |
| *24 | IOA-OAA-NaSS | 87:12:1 | C | 1.6 | 44 | 74.8 | 1.9 | 1.9 |
| **25 | IOA-OAA-NaSS | 87:12:1 | D | 0.2 | 42 | 68.1 | 5.1 | 1.3 |
| **26 | IOA-OAA-NaSS | 87:12:1 | D | 0.4 | 44 | 71.4 | 3.8 | 3.8 |
| **27 | IOA-OAA-NaSS | 87:12:1 | D | 0.6 | 45 | 76.5 | 1.3 | 0.6 |
| **28 | IOA-OAA-NaSS | 87:12:1 | D | 0.8 | 47 | 80.8 | 0.6 | 0 |
| **29 | IOA-OAA-NaSS | 87:12:1 | D | 1.0 | 48 | 83.4 | 0 | 0 |
| 30 | IOA-OAA-NaSS | 87:12:1 | D | 1.2 | 48 | 87.7 | 0 | 0 |
| 31 | IOA-OAA-NaSS | 87:12:1 | D | 1.4 | 49 | 87.8 | 0 | 0 |
| 32 | IOA-OAA-NaSS | 87:12:1 | D | 1.6 | 51 | 90.5 | 0 | 0 |
| **33 | IOA-OAA-NaSS | 87:12:1 | D | 1.0 | 42 | 84.1 | 0 | 0 |
| 34 | IOA-OAA-NaSS | 87:12:1 | E | 2.0 | 43 | 89.8 | 0 | 0 |
| 35 | IOA-OAA-NaSS | 87:12:1 | E | 3.0 | 45 | 91.6 | 0 | 0 |
| 36 | IOA-OAA-NaSS | 87:12:1 | E | 4.0 | 46 | 92.2 | 0 | 0 |
| 37 | IOA-OAA-NaSS | 87.6:12:0.4 | E | 1.0 | 44 | 92.0 | 0 | 0 |
| 38 | IOA-OAA-NaSS | 87.6:12:0.4 | E | 2.0 | 49 | 97.6 | 0 | 0 |
| 39 | IOA-OAA-NaSS | 87.6:12:0.4 | E | 3.0 | 49 | 94.9 | 0 | 0 |
| 40 | IOA-OAA-NaSS | 87.6:12:0.4 | E | 4.0 | 50 | 96.1 | 0 | 0 |
| **41 | IOA-OAA-NaSS | 87:12:1 | D | 1.0 | 44 | 81.4 | 0 | 0 |
| 42 | IOA-OAA-NaSS | 87:12:1 | D | 2.0 | 47 | 87.5 | 0 | 0 |
| 43 | IOA-OAA-NaSS | 87:12:1 | D | 3.0 | 49 | 90.8 | 0 | 0 |
| 44 | IOA-OAA-NaSS | 87:12:1 | D | 4.0 | 52 | 90.0 | 0 | 0 |
| 45 | IOA-OAA-NaSS | 87.6:12:0.4 | D | 1.0 | 52 | 92.7 | 0 | 0 |
| 46 | IOA-OAA-NaSS | 87.6:12:0.4 | D | 2.0 | 54 | 94.3 | 0 | 0 |
| 47 | IOA-OAA-NaSS | 87.6:12:0.4 | D | 3.0 | 55 | 94.5 | 0 | 0 |

TABLE I-continued

| PSA Tape | Monomers | Ratio | External Type | Emulsifier Level(phr) | Peel Adhesion (N/dm) | Quick Dry Test (% Water Loss) | Curved Panel Lifting Test at 150° C. 50 J (cm) | BC/CC (cm) |
|---|---|---|---|---|---|---|---|---|
| 48 | IOA-OAA-NaSS | 87.6:12:0.4 | D | 4.0 | 55 | 94.9 | 0 | 0 |

*Comparative Example - PSA tapes numbered 1-24 and marked with an asterick are outside the scope of the invention and are included for comparative purposes.
**Comparative Example - These comparatives show the criticality of the phosphate emulsifier level, although the identical emulsifier monomers and phosphate emulsifiers are used to PSAs of the invention, the relative levels have not been optimized and the PSAs do not show improved properties.

PSA Tapes 49-61

A split-resin flask of 5000-ml capacity was fitted with a variable speed agitator, condensor, purging tube for introducing nitrogen, and a recording temperature controller. The following components were added to the flask while purging the flask with nitrogen. A solution of 243.3 g n-octylacrylamide in 1698.9 g of isooctylacrylate was charged to the flask. A solution of 5.86 g of sodium dodecyl benzene sulfonate in 1463.50 g of deionized water was next charged to the flask. While stirring, the temperature was raised to 50° C. A solution of 19.53 g sodium styrene sulfonate and 2.34 g of sodium bicarbonate in 200 g of deionized water was next charged to the flask. Then a first initiator charge of 1.2 g potassium persulfate and 0.4 g sodium metabisulfite was added. Polymerization started in about ½ hour. The temperature was held at 50° C. by heating and cooling as required during polymerization. Eight ml of a 5% aqueous solution of sodium metabisulfite was added 5 hours after the first initiator charge, and 12 ml of a 5% aqueous solution of sodium meta-bisulfite and 12 ml of a 5% aqueous solution of potassium persulfate were added 7 hours after the first initiator charge. The emulsion was heated another 9 hours to complete the polymerization. Monomer ratio = 87:12:1.

This emulsion was coated onto a paper backing as described in the Curved Panel Lifting Test at 150° C. to provide PSA Tape 49 for which Test Results are reported in Table II along with results of testing PSA Tapes 50-61 which differ from PSA Tape 49 as indicated in Table II.

TABLE II

| PSA Tape | External Emulsifier Type | Level (phr) | Quick Dry Test (% Water Loss) | Peel Adhesion (N/dm) | Curved Panel Lifting Test at 150° C. 50 J (cm) | CC/BC (cm) |
|---|---|---|---|---|---|---|
| *49 | None | — | 83.0 | 42 | 5.6 | 8.4 |
| *50 | A | 1 | 91.3 | 34 | 1.9 | 0 |
| *51 | A | 2 | 94.4 | 24 | 0 | 0 |
| *52 | A | 3 | 93.2 | 25 | 0 | 0 |
| *53 | B | 1 | 80.0 | 39 | 0 | 0.3 |
| *54 | B | 2 | 82.8 | 35 | 0.8 | 0 |
| *55 | B | 3 | 82.8 | 34 | 1.0 | 0 |
| *56 | C | 1 | 94.9 | 33 | 3.2 | 1.4 |
| *57 | C | 2 | 94.0 | 21 | 5.4 | 1.0 |
| *58 | C | 3 | 95.3 | 20 | 0 | 2.2 |
| 59 | F | 1 | 90.7 | 36 | 0 | 0 |
| 60 | F | 2 | 95.3 | 37 | 0 | 0 |
| 61 | F | 3 | 95.8 | 35 | 0 | 0 |

*Comparative Example

PSA Tapes 49-58, and marked with an asterisk are included for comparative purposes. These examples differ in that the emulsifier was added after pressure-sensitive polymerization. These pressure-sensitive adhesives show improved drying; however, the peel adhesion is reduced.

After being stripped off following the Curved Panel Lifting Test at 150° C., adhesive residue was observed on the panels from the comparative PSA Tapes 50, 51, 52, 55, and 58. The other tapes left no residue.

PSA Tapes 62-65

An emulsion was prepared in the same manner as that used in making SPA Tape 49 except the amounts of the following components were changed as follows:

|  | Grams |
|---|---|
| isooctylacrylate | 1691.59 |
| n-octylacrylamide | 204.19 |
| sodium styrene sulfonate | 9.76 |
| sodium bicarbonate | 4.88 |
| sodium dodecyl benzene sulfonate | 9.76 |

Monomer ratio = 87.5:12:0.5.

This emulsion was coated onto a paper backing as described in the Curved Panel Lifting Test at 150° C. to provide PSA Tape 62 for which test results are reported in Table III along with results of testing PSA Tapes 63-65 which differ from PSA Tape 62 as indicated in Table III.

TABLE III

| PSA Tape | External Emulsifier Type | Level (phr) | Quick Dry Test (% Water Loss) | Peel Adhesion (N/dm) | Curved Panel Lifting Test at 150° C. 50 J (cm) | CC/BC (cm) |
|---|---|---|---|---|---|---|
| *62 | None | — | 71.7 | 48 | 0 | 0 |
| 63 | D | 0.5 | 89.0 | 48 | 0 | 0 |
| 64 | D | 1 | 94.2 | 46 | 0 | 0 |
| 65 | D | 2 | 97.0 | 40 | 0 | 0 |

*Comparative Example

Each of PSA Tapes 62-65 left no residue after the Curved Panel Lifting Test at 150° C.

PSA Tapes 66-69

To 76.26 g of the coatable emulsion used in making PSA Tape 49 was slowly added 0.77 g of triethanolamine with mold stirring. To this mixture was slowly added 19.14 gm of "Foral" 85 tackifier resin dispersion (a highly stabilized ester rosin commercially available from Hercules, having a softening point of 80° C., an acid number of 9, and a specific gravity of 1.07) with stirring. To this tackified formulation were added various levels of External Emulsifier E followed by coating onto paper backings. Test results are in Table IV.

TABLE IV

| PSA Tape | External Emulsifier Type | Level (phr) | Quick Dry Test (% Water Loss) | Peel Adhesion (N/dm) | Curved Panel Lifting Test at 150° C. 50 J (cm) | CC/BC (cm) |
|---|---|---|---|---|---|---|
| *66 | None | 0 | 81.7 | 53 | 0 | 0 |

TABLE IV-continued

| PSA Tape | External Emulsifier Type | Level (phr) | Quick Dry Test (% Water Loss) | Peel Adhesion (N/dm) | Curved Panel Lifting Test at 150° C. 50 J (cm) | CC/BC (cm) |
|---|---|---|---|---|---|---|
| 67 | E | 1 | 95.9 | 55 | 0 | 0 |
| 68 | E | 2 | 96.4 | 53 | 0 | 0 |
| 69 | E | 3 | 97.0 | 56 | 0 | 0 |

*Comparative Example

After being stripped off following the Curved Panel Lifting Test at 150° C., each of PSA Tapes 66–69 left a barely noticeable adhesive residue. When a new set of tapes identical to PSA Tape 66–69 was tested, none of the tapes left any observable adhesive residue.

PSA Tapes 70–93

The following polymers were prepared according to the procedure described on page 12 except the solids level was raised to 50% and the level of potassium persulfate $k_2S_2O_8$) was increased to 0.38 gm. Test results are in Table V.

-continued

AMPSNa = Sodium salt of 2-acrylamido-2-methylpropyl sulfonic acid
SEMNa = Sodium salt of sulfoethylmethacrylate
SPIK = Bis-(3-sulfopropyl)-itaconic acid ester, di-potassium salt $$SPMK = H_2C=C(CH_3)-C(=O)-O-(CH_2)_3-S(=O)_2-O-K$$

$$AMPSNa = CH_2=C(H)-C(=O)-N(H)-C(CH_3)_2-CH_2S(=O)_2-O-Na$$

$$SEMNa = H_2C=C(CH_3)-C(=O)-O-(CH_2)_2-S(=O)_2-O-Na$$

$$SPIK = HC(-C(=O)-O-(CH_2)_3-S(=O)_2-O-K)=C(-C(=O)-O-(CH_2)_3-S(=O)_2-O-K)$$

TABLE V

| PSA Tape | Monomers | Ratio | External Type | Emulsifier Level(phr) | Peel Adhesion (N/dm) | Quick Dry Test (% Water Loss) | Curved Panel Lifting Test at 150° C. 50 J (cm) | BC/CC (cm) |
|---|---|---|---|---|---|---|---|---|
| *70 | IOA-OAA-NaSS | 87:12:1 | E | 1 | 46 | 84.1 | 0 | 0 |
| 71 | IOA-OAA-NaSS | 87:12:1 | E | 2 | 47 | 89.8 | 0 | 0 |
| 72 | IOA-OAA-NaSS | 87:12:1 | E | 3 | 50 | 91.6 | 0 | 0 |
| 73 | IOA-OAA-NaSS | 87:12:1 | E | 4 | 51 | 92.2 | 0 | 0 |
| *74 | IOA-OAA-NaSS | 87:12:1 | F | 1 | 52 | 78.7 | 1.3 | 1.3 |
| *75 | IOA-OAA-NaSS | 87:12:1 | F | 2 | 56 | 85.6 | 1.9 | 0.6 |
| 76 | IOA-OAA-NaSS | 87:12:1 | F | 3 | 57 | 90.5 | 0 | 0.6 |
| 77 | IOA-OAA-NaSS | 87:12:1 | F | 4 | 57 | 91.2 | 0 | 0.6 |
| *78 | IOA-OAA-NaSS | 87:12:1 | G | 1 | 47 | 63.5 | 1.9 | 1.3 |
| *79 | IOA-OAA-NaSS | 87:12:1 | G | 2 | 46 | 72.0 | 0 | 0 |
| *80 | IOA-OAA-NaSS | 87:12:1 | G | 3 | 45 | 77.2 | 0 | 0 |
| *81 | IOA-OAA-NaSS | 87:12:1 | G | 4 | 44 | 82.4 | 0 | 0 |
| 82 | IOA-OAA-NaSS | 87:12:1 | G | 5 | 37 | 89.0 | 0 | 0 |
| *83 | IOA-OAA-NaSS | 87:12:1 | H | 1 | 25 | 48.0 | 0.6 | 5.1 |
| *84 | IOA-OAA-NaSS | 87:12:1 | H | 2 | 21 | 49.6 | 0 | 2.5 |
| *85 | IOA-OAA-NaSS | 87:12:1 | H | 3 | 24 | 54.9 | 0 | 1.9 |
| *86 | IOA-OAA-NaSS | 87:12:1 | H | 4 | 28 | 72.9 | 0 | 3.8 |
| *87 | IOA-OAA-NaSS | 87:12:1 | I | 1 | 44 | 61.0 | 0 | 0.6 |
| *88 | IOA-OAA-NaSS | 87:12:1 | I | 2 | 42 | 74.3 | 0 | 0 |
| *89 | IOA-OAA-NaSS | 87:12:1 | I | 3 | 40 | 82.5 | 0 | 0 |
| 90 | IOA-OAA-NaSS | 87:12:1 | I | 4 | 36 | 87.1 | 0 | 0 |
| *91 | IOA-OAA-NaSS | 87:12:1 | J | 1 | 22 | 53.9 | 1.9 | 1.4 |
| *92 | IOA-OAA-NaSS | 87:12:1 | J | 2 | 21 | 83.9 | 0.6 | 0.6 |
| *93 | IOA-OAA-NaSS | 87:12:1 | J | 3 | 8 | 90.7 | 0 | 0 |
| *94 | IOA-OAA-NaSS | 87:12:1 | J | 4 | 7 | 92.6 | 0 | 0 |

*Comparative Example - These PSA tapes marked with an asterick are outside the invention and are included for comparative purposes.

PSA Tapes 95–126

The following latices were prepared according to the procedure described on page 10 except that the following different ionomers were substituted for sodium styrene sulfonate.

SPMK = Potassium salt of sulfopropylmethacrylate

After being stripped off following the Curved Panel Lifting Test at 150° C., adhesive residue was observed on the panels from Comparative PSA Tapes 94, 102, 103, 110, 111, 112, 118, and 119. The other tapes left no residue. Test results are in Table VI.

TABLE VI

| PSA Tape | Monomers | Ratio | External Type | Emulsifier Level(phr) | Peel Adhesion (N/dm) | Quick Dry Test (% Water Loss) | Curved Panel Lifting Test at 150° C. 50 J (cm) | BC/CC (cm) |
|---|---|---|---|---|---|---|---|---|
| **95 | IOA-OAA-SPMK | 87:12:1 | D | 0.2 | 50 | 73.3 | 0 | 0 |
| **96 | IOA-OAA-SPMK | 87:12:1 | D | 0.4 | 52 | 80.7 | 0 | 0 |
| **97 | IOA-OAA-SPMK | 87:12:1 | D | 0.6 | 53 | 80.5 | 0 | 0 |
| **98 | IOA-OAA-SPMK | 87:12:1 | D | 0.8 | 53 | 81.3 | 0 | 0 |
| **99 | IOA-OAA-SPMK | 87:12:1 | D | 1.0 | 54 | 80.2 | 0 | 0 |

TABLE VI-continued

| PSA Tape | Monomers | Ratio | External Emulsifier Type | Emulsifier Level(phr) | Peel Adhesion (N/dm) | Quick Dry Test (% Water Loss) | Curved Panel Lifting Test at 150° C. 50 J (cm) | BC/CC (cm) |
|---|---|---|---|---|---|---|---|---|
| **100 | IOA-OAA-SPMK | 87:12:1 | D | 1.2 | 55 | 84.6 | 0 | 0 |
| **101 | IOA-OAA-SPMK | 87:12:1 | D | 1.4 | 55 | 84.6 | 0 | 0 |
| 102 | IOA-OAA-SPMK | 87:12:1 | D | 1.6 | 53 | 88.2 | 0 | 0 |
| **103 | IOA-OAA-AMPSNa | 87:12:1 | D | 0.2 | 53 | 83.3 | 0 | 0 |
| 104 | IOA-OAA-AMPSNa | 87:12:1 | D | 0.4 | 53 | 89.8 | 0 | 0 |
| 105 | IOA-OAA-AMPSNa | 87:12:1 | D | 0.6 | 57 | 93.1 | 0 | 0 |
| 106 | IOA-OAA-AMPSNa | 87:12:1 | D | 0.8 | 56 | 92.1 | 0 | 0 |
| 107 | IOA-OAA-AMPSNa | 87:12:1 | D | 1.0 | 55 | 86.0 | 0 | 0 |
| 108 | IOA-OAA-AMPSNa | 87:12:1 | D | 1.2 | 61 | 93.2 | 0 | 0 |
| 109 | IOA-OAA-AMPSNa | 87:12:1 | D | 1.4 | 58 | 91.3 | 0 | 0 |
| 110 | IOA-OAA-AMPSNa | 87:12:1 | D | 1.6 | 58 | 95.4 | 0 | 0 |
| **111 | IOA-OAA-SEMNa | 87:12:1 | D | 0.2 | 52 | 75.9 | 0 | 0 |
| **112 | IOA-OAA-SEMNa | 87:12:1 | D | 0.4 | 54 | 79.5 | 0 | 0 |
| **113 | IOA-OAA-SEMNa | 87:12:1 | D | 0.6 | 56 | 84.1 | 0 | 0 |
| **114 | IOA-OAA-SEMNa | 87:12:1 | D | 0.8 | 56 | 86.5 | 0 | 0 |
| 115 | IOA-OAA-SEMNa | 87:12:1 | D | 1.0 | 56 | 87.0 | 0 | 0 |
| 116 | IOA-OAA-SEMNa | 87:12:1 | D | 1.2 | 56 | 90.6 | 0 | 0 |
| 117 | IOA-OAA-SEMNa | 87:12:1 | D | 1.4 | 56 | 91.8 | 0 | 0 |
| 118 | IOA-OAA-SEMNa | 87:12:1 | D | 1.6 | 57 | 94.0 | 0 | 0 |
| **119 | IOA-OAA-SPIK | 87:12:1 | D | 0.2 | 47 | 66.3 | 0 | 0 |
| **120 | IOA-OAA-SPIK | 87:12:1 | D | 0.4 | 47 | 85.7 | 0 | 0 |
| 121 | IOA-OAA-SPIK | 87:12:1 | D | 0.6 | 51 | 92.9 | 0 | 0 |
| 122 | IOA-OAA-SPIK | 87:12:1 | D | 0.8 | 45 | 93.2 | 0 | 0 |
| 123 | IOA-OAA-SPIK | 87:12:1 | D | 1.0 | 48 | 96.3 | 0 | 0 |
| 124 | IOA-OAA-SPIK | 87:12:1 | D | 1.2 | 48 | 96.4 | 0 | 0 |
| 125 | IOA-OAA-SPIK | 87:12:1 | D | 1.4 | 48 | 96.2 | 0 | 0 |
| 126 | IOA-OAA-SPIK | 87:12:1 | D | 1.6 | 51 | 97.1 | 0 | 0 |

*Comparative Example - These comparatives show the criticality of the phosphate emulsifier level, although the identical emulsifier monomers and phosphate emulsifiers are used tp PSAs of the invention, the relative levels have not been optimized and the PSAs do not show improved properties.

What is claimed is:

1. A cleanly removable pressure-sensitive adhesive made from an aqueous dispersion of said adhesive wherein said adhesive comprises a copolymer of monomers comprising
   (a) from 95 to 99.9 by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and
   (b) from 0.1 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100 and said adhesive further comprising a phosphate emulsifier comprising from 0.5 part by weight to about 8 parts by weight of the adhesive, said phosphate emulsifier selected from at least one of
   (i) polyoxyethylene phosphate having the formula wherein
   at least one of $R_1$, $R_2$ and $R_3$ is $R-O-(-CH_2CH_2O)_n-$ and the others are $-OH$; R is selected from alkyl, alkenyl, aryl and alkylaryl; and n is a positive integer; and
   (ii) a salt of (i)
wherein said aqueous dispersion of said adhesive has the property that it can be dried at a rate that at least 87% of the water contained in the dispersion is evaporated when the dispersion is exposed to hot air at 200° F. for 20 minutes, and wherein said adhesive has a peel adhesion of at least about 35 N/dm.

2. A cleanly removable pressure-sensitive adhesive as defined in claim 1 wherein from 0.5 to 4.0 parts by weight comprises the phosphate emulsifier.

3. A cleanly removable pressure-sensitive adhesive as defined in claim 1 wherein the phosphate emulsifier has the formula:

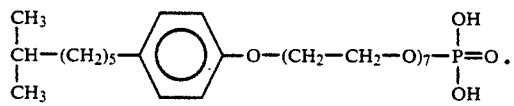

4. A cleanly removable pressure-sensitive adhesive as defined in claim 1 wherein the phosphate emulsifier has the formula:

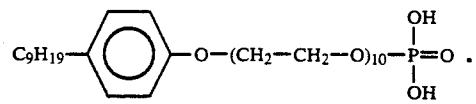

5. A cleanly removable pressure-sensitive adhesive as defined in claim 1 wherein the phosphate emulsifier has the formula:

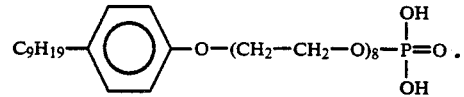

6. A cleanly removable pressure-sensitive adhesive tape having a backing carrying a layer of pressure-sensitive adhesive as defined in claim 1.

7. A cleanly removable pressure-sensitive adhesive tape as defined in claim 6 wherein from 0.5 to 4.0 parts by weight of the adhesive layer comprises the phosphate emulsifier.

8. A cleanly removable pressure-sensitive adhesive tape as defined in claim 6 wherein the phosphate emulsifier has the formula:

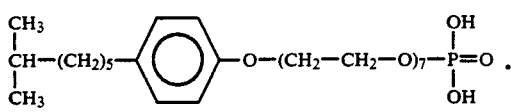

9. A cleanly removable pressure-sensitive adhesive tape as defined in claim 6 wherein the phosphate emulsifier has the formula:

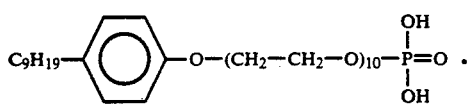

10. A cleanly removable pressure-sensitive adhesive tape as defined in claim 6 wherein the phosphate emulsifier has the formula:

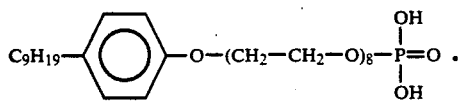

11. A cleanly removable pressure-sensitive adhesive tape as defined in claim 6 wherein the backing is a plastic film.

12. A cleanly removable pressure-sensitive adhesive tape as defined in claim 6 wherein the backing is paper.

13. A cleanly removable pressure-sensitive adhesive tape as defined in claim 6 wherein $R_2$ and $R_3$ are OH.

14. Method of making the cleanly removable pressure-sensitive adhesive of claim 1 comprising the steps of
   (1) forming an aqueous dispersion of
      (a) from 95 to 99.9 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12,
      (b) from 0.1 to 5 parts of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100, and
      (c) phosphate emulsifier comprising from 0.5 part to about 8 part of the adhesive layer, said phosphate emulsifier being selected from at least one of
         (i) polyoxyethylene phosphate having the formula

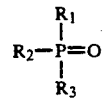

wherein
      at least one of $R_1$, $R_2$ and $R_3$ is $R-O-(-CH_2CH_2O)_n-$ and the others are $-OH$; R is selected from alkyl, alkenyl, aryl and alkylaryl; and n is a positive integer; and (ii) a salt of (i), and
   (2) copolymerizing monomers (a) and (b).

15. Method of making the cleanly removable pressure-sensitive adhesive tape of claim 6 comprising the steps of
   (1) forming an aqueous dispersion of
      (a) from 95 to 99.9 parts of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12,
      (b) from 0.1 to 5 parts by weight of at least one vinyl-unsaturated, homopolymerizable emulsifier monomer which is a surfactant having both a hydrophobic and hydrophilic moiety, contains at least 5 but not more than 40 carbon atoms, and it water-dispersible, the total parts by weight of (a) plus (b) being 100, and
      (c) phosphate emulsifier comprising from 0.5 parts to about 8 parts of the adhesive layer, said phosphate emulsifier being selected from at least one of
         (i) polyoxyethylene phosphate having the formula

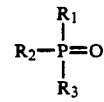

wherein
      at least one of $R_1$, $R_2$ and $R_3$ is $R-O-(-CH_2CH_2O)_n-$ and the others are $-OH$; R is selected from alkyl, alkenyl, aryl and alkylaryl; and n is a positive integer; and
      (ii) a salt of (i)
   (2) copolymerizing monomers (a) and (b);
   (3) coating the dispersion onto a backing, and
   (4) drying the coating to provide a cleanly removable pressure sensitive adhesive tape, said coating having the property permitting drying to occur so that at least 87% of the water contained in the coating is evaporated when the coating is exposed to hot air at 200° F. for 20 minutes, said adhesive tape having a peel adhesion of at least 35 N/dm.

* * * * *

UNITED STATES PATENT AND TRADEMARK OFFICE
CERTIFICATE OF CORRECTION

PATENT NO. : 5,116,676
DATED : May 26, 1992
INVENTOR(S) : LOUIS E. WINSLOW

It is certified that error appears in the above-identified patent and that said Letters Patent is hereby corrected as shown below:

Column 13, Claim 1, line 57, after "formula" the following formula should be inserted $$R_2 - \underset{R_3}{\overset{R_1}{P}} = O$$

Signed and Sealed this

Twentieth Day of July, 1993

Attest:

MICHAEL K. KIRK

*Attesting Officer*     Acting Commissioner of Patents and Trademarks